US012625642B2

(12) United States Patent
Papagianni et al.

(10) Patent No.: US 12,625,642 B2
(45) Date of Patent: May 12, 2026

(54) TEMPERATURE-BASED READ DISTURB OPERATIONS

(71) Applicant: Micron Technology, Inc., Boise, ID (US)

(72) Inventors: Christina Papagianni, San Jose, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/751,673

(22) Filed: Jun. 24, 2024

(65) Prior Publication Data

US 2025/0004663 A1 Jan. 2, 2025

Related U.S. Application Data

(60) Provisional application No. 63/523,553, filed on Jun. 27, 2023.

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 2008/0082290 A1 | 4/2008 | Jeong et al. | |
| 2016/0124679 A1* | 5/2016 | Huang | G06F 12/0223 |
| | | | 711/103 |
| 2020/0097211 A1* | 3/2020 | Alsasua | G06F 3/064 |
| 2020/0251162 A1* | 8/2020 | Alsasua | G11C 7/04 |
| 2020/0387324 A1* | 12/2020 | Muchherla | G06F 3/0604 |
| 2022/0139481 A1* | 5/2022 | Rayaprolu | G06F 12/0882 |
| | | | 365/185.09 |
| 2022/0155956 A1* | 5/2022 | Rayaprolu | G11C 11/5642 |
| 2022/0293183 A1 | 9/2022 | Padilla | |

(Continued)

OTHER PUBLICATIONS

"International Application Serial No. PCT US2024 035255, International Search Report mailed Oct. 10, 2024", 3 pages.

(Continued)

*Primary Examiner* — Nicholas A. Paperno
(74) *Attorney, Agent, or Firm* — Schwegman Lundberg & Woessner, P.A.

(57) ABSTRACT

Aspects of the present disclosure configure a system component, such as a memory sub-system controller, to provide adaptive media management based on temperature-related memory component capabilities. The controller determines a read disturb condition criterion associated with an individual memory component of a set of memory components and determines a temperature of a memory sub-system comprising the set of memory components. The controller adjusts the read disturb condition criterion based on the temperature and program erase cycles (PEC) of the memory sub-system and performs an individual media management operation on the individual memory component in response to determining that the adjusted read disturb condition criterion has been satisfied.

19 Claims, 5 Drawing Sheets

(56) References Cited

U.S. PATENT DOCUMENTS

| | | | |
|---|---|---|---|
| 2022/0350521 A1* | 11/2022 | Liu | G11C 13/0033 |
| 2023/0036616 A1* | 2/2023 | Kim | G06F 3/0649 |
| 2023/0055963 A1 | 2/2023 | Cho et al. | |
| 2023/0095179 A1 | 3/2023 | Bueb et al. | |
| 2023/0110664 A1 | 4/2023 | Egan | |
| 2023/0185488 A1* | 6/2023 | Lai | G06F 3/064 |
| | | | 711/154 |

OTHER PUBLICATIONS

"International Application Serial No. PCT US2024 035255, Written Opinion mailed Oct. 10, 2024", 4 pages.

* cited by examiner

300

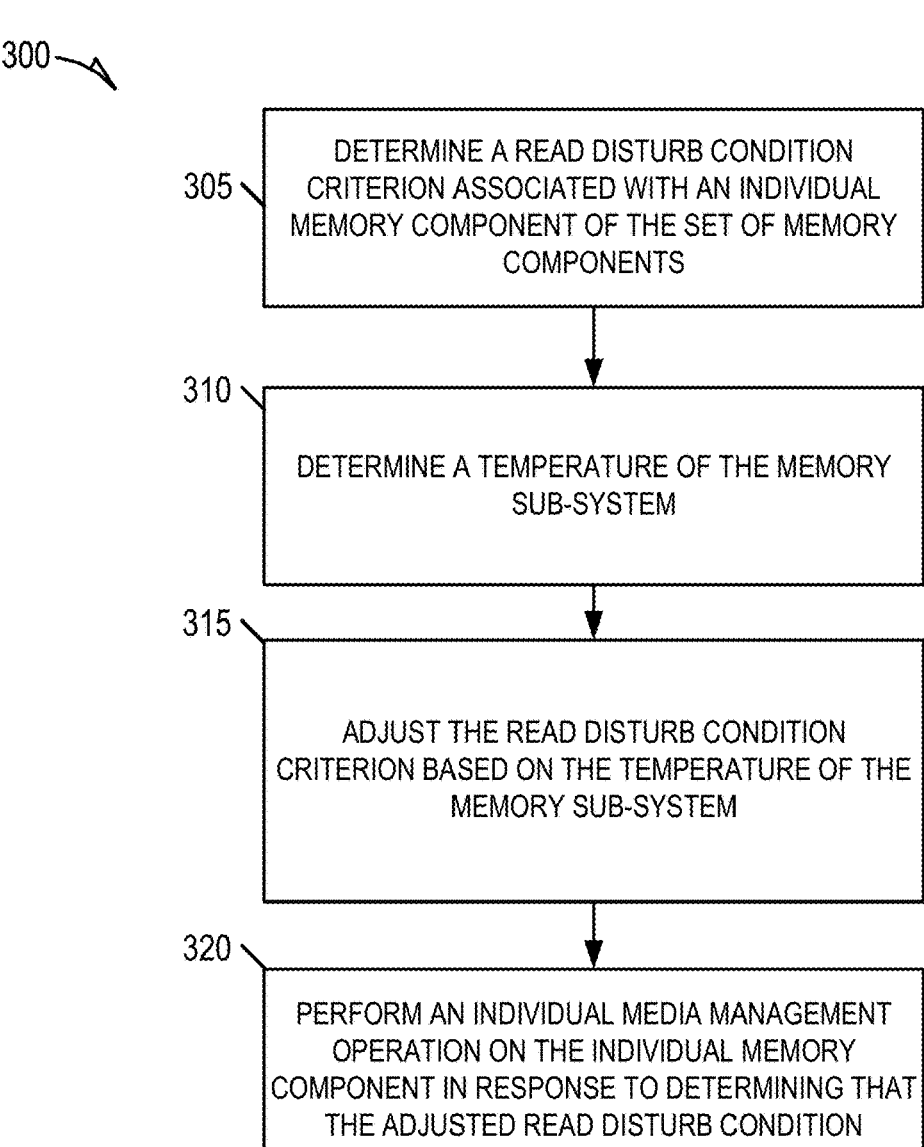

305 — DETERMINE A READ DISTURB CONDITION CRITERION ASSOCIATED WITH AN INDIVIDUAL MEMORY COMPONENT OF THE SET OF MEMORY COMPONENTS

310 — DETERMINE A TEMPERATURE OF THE MEMORY SUB-SYSTEM

315 — ADJUST THE READ DISTURB CONDITION CRITERION BASED ON THE TEMPERATURE OF THE MEMORY SUB-SYSTEM

320 — PERFORM AN INDIVIDUAL MEDIA MANAGEMENT OPERATION ON THE INDIVIDUAL MEMORY COMPONENT IN RESPONSE TO DETERMINING THAT THE ADJUSTED READ DISTURB CONDITION CRITERION HAS BEEN SATISFIED

410 — Read disturb scan

420 — Detect read temp & pec ?

430 — Adjust read count_threshold=f(temp, pec)

440 — Perform reads command on mandatory WL

450 — RBER>rber_threshold ?

Yes → 460 — Block refresh

No ↓

440 — Pass/continue with next command/operation

TEMPERATURE-BASED READ DISTURB OPERATIONS

PRIORITY APPLICATION

This application claims the benefit of priority to U.S. Provisional Application Ser. No. 63/523,553, filed Jun. 27, 2023, which is incorporated herein by reference in its entirety.

TECHNICAL FIELD

Examples of the disclosure relate generally to memory sub-systems and, more specifically, to providing temperature-based media management for memory components, such as memory dies or memory blocks.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIGS. 3-4 are flow diagrams of example methods to perform media management operations based on temperature of the memory sub-system, in accordance with some examples.

DETAILED DESCRIPTION

Figure 1:
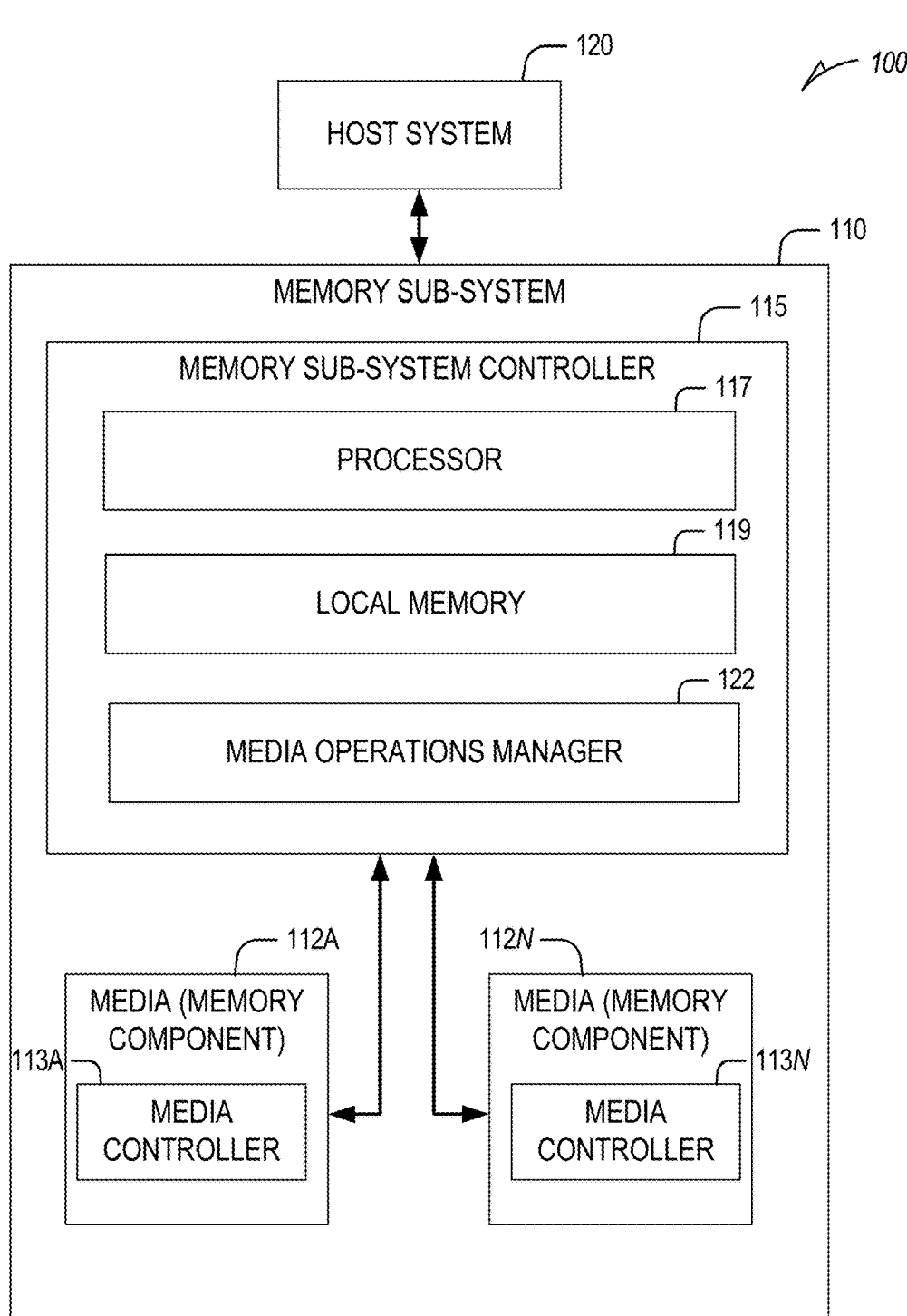
FIG. 1 is a block diagram illustrating an example computing environment including a memory sub-system, in accordance with some examples.

Aspects of the present disclosure configure a system component, such as a memory sub-system controller, to perform memory management operations on different groups of memory components (e.g., memory dies and/or memory blocks) based on their respective read disturb counts adjusted based on temperature and/or program erase cycle (PEC) count values. The memory sub-system controller can determine a current temperature of the memory sub-system that includes the memory components and can access a table that maps read disturb condition criteria (e.g., read disturb count thresholds) with different temperature ranges and/or PEC count values. The memory sub-system controller can select or identify a read disturb condition criterion for an individual memory component based on the table and can, in response, determine that the read disturb condition criterion for the individual memory component is satisfied. In such cases, the memory sub-system controller can perform an individual media management operation on the individual memory component, such as by performing a read disturb scan operation.

This enables the controller to dynamically select the frequency at which read disturb scan operations or other memory management operations are performed for the memory sub-system based on temperature of the memory sub-system and/or the PEC count values of individual components of the memory sub-system, which improves the overall efficiency of operating the memory sub-system. Namely, rather than applying the same read disturb condition criterion to all of the memory components, the memory sub-system controller can adjust that criterion on the basis of temperature and PEC count values to avoid having to perform read disturb operations when not necessary or to ensure the read disturb operations are performed in temperature-critical states.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data". Together with the data written to each memory component or group of memory components, the memory sub-system or host can measure and store the current write temperature. In some examples, different memory components can store data that is associated with different write temperatures as temperature naturally drifts as data is written. The different memory components or memory blocks can each store a respective read count value indicating the quantity or number of times the respective memory component or memory block has been read. This read count value can be compared against a read disturb condition criterion (e.g., a read count threshold) which can be used to control when read disturb scan operations are performed for the memory component or memory block. Read disturb scan operations involve reading data from one or more portions or specified word lines (WLs) of the memory component or memory block and determining whether a read bit error rate (RBER) of the read data transgresses a threshold. If so, the read disturb scan operations refresh or fold the data from the memory component or memory block to another memory component or memory block. If not, the read disturb scan operations continue monitoring and/or accessing a different memory component and/or memory block.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management (e.g., read disturb scan operations), different near miss error correction code (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, certain memory devices, such as NAND flash devices, include large die-by-die reliability (RWB) variation and temperature dependence. Certain die can be capable of withstanding (to avoid data loss) particular cross temperatures or temperature ranges while other dies can handle wider temperature ranges. As the technology for such memory devices continues to be scaled down, this die-by-die reliability variation and cross-temperature ranges become more pronounced and problematic in performing memory management. Current memory systems (e.g., SSD drive or die package systems) associate all of the memory devices in the memory system with a certain reliability specification and temperature ranges or thresholds. The memory systems need to meet the reliability specification to be approved for use and cannot include any particular memory device that fails to meet the reliability specification.

Typical memory systems routinely monitor the read count values of different memory blocks to control performing read disturb scan operations. Such read disturb scan operations are usually performed when the read count values of the memory blocks reach a read count threshold or read count threshold value. The read count threshold value is usually set to some predetermined value that ensures the memory blocks are tested for RBER a sufficient number of times. While this generally works well, having to perform read disturb scan operations based on the predetermined read count threshold can result in wasted memory management operations. Namely, the memory components or memory blocks may have better read performance at some temperatures or conditions than others. Applying the same read count threshold regardless of the temperature or other conditions can result in performing the read disturb operations unnecessarily in situations where the memory blocks perform well.

As a result, an unnecessary amount of memory management operations can end up being performed on memory dies when not entirely necessary, which can adversely impact the overall performance of the memory system. Also, a lack of performing memory management operations a sufficient quantity of times can result in data loss or high RBER. Current memory systems fail to provide a solution that addresses the needs of all memory devices and applications based on current temperature ranges and/or PEC count values of the memory devices and/or memory blocks. Applying a one-size-fits all approach, as in the current memory systems, results in poor memory performance and added inefficiencies, which wastes resources.

Aspects of the present disclosure address the above and other deficiencies by providing a memory controller that can determine a current temperature of the memory sub-system (and/or temperature of any component of the memory sub-system determined using one or more temperature sensors) that includes the memory components and can access a table that maps read disturb condition criteria (e.g., read disturb count thresholds) with different temperature ranges and/or PEC count values. The memory sub-system controller can select or identify a read disturb condition criterion for an individual memory component based on the table and can, in response, determine that the read disturb condition criterion for the individual memory component is satisfied. In such cases, the memory sub-system controller can perform an individual media management operation on the individual memory component, such as by performing a read disturb scan operation. This increases the efficiency of operating memory systems because the memory controller dynamically selects or sets the frequency at which read disturb scan operations or other memory management operations are performed for the memory sub-system based on temperature of the memory sub-system and/or the PEC count values of individual components of the memory sub-system, which improves the overall efficiency of operating the memory sub-system.

For some examples, the memory sub-system (e.g., memory sub-system controller) determines a read disturb condition criterion associated with an individual memory component of the set of memory components. The memory sub-system controller determines a temperature of the memory sub-system, adjusting the read disturb condition criterion based on the temperature of the memory sub-system. The memory sub-system controller performs an individual media management operation on the individual memory component in response to determining that the adjusted read disturb condition criterion has been satisfied.

In some examples, the adjusted read disturb condition criterion includes an adjusted read count threshold. In some examples, the memory sub-system controller accesses a current read counter associated with the individual memory component. The memory sub-system controller determines that the current read counter transgresses the adjusted read count threshold. The adjusted read disturb condition criterion can be satisfied in response to determining that the current read counter transgresses the adjusted read count threshold.

In some examples, the memory sub-system controller increments the current read counter each time a read operation is performed for the individual memory component. In some cases, the individual media management operation includes a read disturb operation including reading data from the individual memory component and computing a RBER for the data read from the individual memory component. In some examples, the memory sub-system controller compares the RBER to an RBER threshold. The memory sub-system controller refreshes or folds the data stored in the individual memory component in response to comparing the RBER to the RBER threshold, such as if the RBER transgresses the RBER threshold.

In some examples, the memory sub-system controller identifies a subset of WLs of the individual memory component that are associated with increased temperature sensitivity relative to other WLs of the individual memory component. In some cases, the memory sub-system controller reads the data from only the subset of WLs to compute the RBER for the read disturb operation.

In some examples, the set of memory components include one or more memory dies. In some cases, the set of memory components include one or more memory blocks. In some examples, the memory sub-system controller accesses a temperature threshold. The memory sub-system controller determines whether the temperature of the memory sub-system is below the temperature threshold. The memory sub-system controller sets the read disturb condition criterion to a first read disturb condition criterion in response to determining that the temperature of the memory sub-system is below the temperature threshold. In some cases, the memory sub-system controller sets the read disturb condition criterion to a second read disturb condition criterion in response to determining that the temperature of the memory sub-system is above the temperature threshold.

In some examples, the second read disturb condition criterion is selected independently of a PEC associated with the individual memory component in response to determining that the temperature of the memory sub-system is above the temperature threshold. In some examples, the memory sub-system controller computes a PEC associated with the individual memory component and selects the second read disturb condition criterion from a plurality of criteria based on the PEC associated with the individual memory component. In some cases, the memory sub-system controller determines that the PEC corresponds to a beginning of life (BOL) of the individual memory component and selects a first read count threshold value as the second read disturb condition. In some cases, the memory sub-system controller determines that the PEC corresponds to an end of life (EOL) of the individual memory component and selects a second read count threshold value as the second read disturb condition. The second read count threshold can be greater than the first read count threshold.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the first memory component 112A or group of memory components including the first memory component 112A can be associated with a first temperature threshold (or tolerance) and/or reliability (capability) grade, value or measure. Reliability grade, value or measure is used interchangeably throughout and can have the same meaning. Temperature threshold and temperature tolerance measure is used interchangeably throughout and can have the same meaning. The second memory component 112N or group of memory components including the second memory component 112N can be associated with a second temperature threshold and/or reliability (capability) grade, value or measure. In some examples, each memory component 112A to 112N can store respective configuration data that specifies the respective temperature threshold. In some examples, a memory or register can be associated with all of the memory components 112A to 112N which can store a table that maps different groups, bins or sets of the memory components 112A to 112N to respective temperature thresholds. In some examples, each of the memory components 112A to 112N can store a write temperature that has been measured when data was written to the respective memory component 112A to 112N. This data can be stored in a separate write temperature register of each memory component 112A to 112N and/or as part of the underlying data stored to the respective memory component 112A to 112N.

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes NOR-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory.

In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages, WLs or blocks that can refer to a unit of the memory component 112 used to store data. In general, the memory pages, WLs, and/or blocks are collectively or individually referred to as memory components.

In some examples, the memory cells of the memory components 112A to 112N can be grouped into a set of different zones of equal or unequal size used to store data for corresponding applications. In such cases, each application can store data in an associated zone of the set of different zones. In some examples, different memory cells within each memory component 112A to 112N can be associated with different temperature thresholds. In some examples, different memory cells within each memory component 112A to 112N can be associated with write temperatures. In such cases, different memory management operations can be performed on different groups of memory cells within each memory component 112A to 112N based on deviations between the write temperatures and the corresponding temperature thresholds associated with the respective memory component 112A to 112N.

The memory sub-system controller 115 can communicate with the memory components 112A to 112N to perform operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management operations, such as read disturb scan operations, different near miss ECC operations, folding operations, preventing folding operations from being performed, and/or different dynamic data refresh operations.

The memory sub-system controller 115 can include hardware such as one or more integrated circuits and/or discrete components, one or more thermometers (used to measure a current operating temperature of the memory sub-system 110 and/or the memory components 112A to 112N or ambient temperature), a buffer memory, and/or a combination thereof. In some examples, the output of the one or more thermometers can be used to determine a current write temperature to be stored in association with data on the memory components 112A to 112N.

The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the temperature thresholds and/or reliability grades associated with different groups of the memory components 112N to 112N. The configuration data can define different read disturb conditions or criteria, such as different read count thresholds that are used to control execution and triggering of read disturb scan operations for different memory components 112A to 112N. For example, the configuration data can associate a first temperature range with a first set of read disturb criteria (e.g., a first read count threshold for a first quantity of PEC count values (e.g., corresponding to a BOL) and a second read count threshold for a second quantity of PEC count values (e.g., corresponding to an EOL). The configuration data can associate a second temperature range with a second set of read disturb criteria (e.g., a third read count threshold for the first quantity of PEC count values (e.g., corresponding to a BOL) and a fourth read count threshold for the second quantity of PEC count values (e.g., corresponding to an EOL). Any other quantities of temperature ranges and corresponding sets of read disturb criteria can be stored in the configuration data (e.g., as a table).

The memory sub-system controller 115 can be responsible for other memory management operations, such as wear leveling operations, garbage collection operations, error detection and error-correcting code (ECC) operations, encryption operations, caching operations, media scans, data refreshing, read disturb operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to determine a current temperature of the memory sub-system 110 that includes the memory components 112A to 112N and can access a table (e.g., from the configuration data) that maps read disturb condition criteria (e.g., read disturb count thresholds) with different temperature ranges and/or PEC count values. The media operations manager 122 can access a temperature measurement from one or more sensors of the memory components 112A to 112N to determine the temperature of the memory sub-system 110. The media operations manager 122 can select or identify a read disturb condition criterion for an individual memory component based on the table and can, in response, determine that the read disturb condition criterion for the individual memory component is satisfied. In such cases, the media operations manager 122 can perform an individual media management operation on the individual memory component, such as by performing a read disturb scan operation. This increases the efficiency of operating memory systems because the memory controller dynamically selects or sets the frequency at which read disturb scan operations or other memory management operations are performed for the memory sub-system 110 based on temperature of the memory sub-system and/or the PEC count values of individual components of the memory sub-system 110, which improves the overall efficiency of operating the memory sub-system 110.

Depending on the examples, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
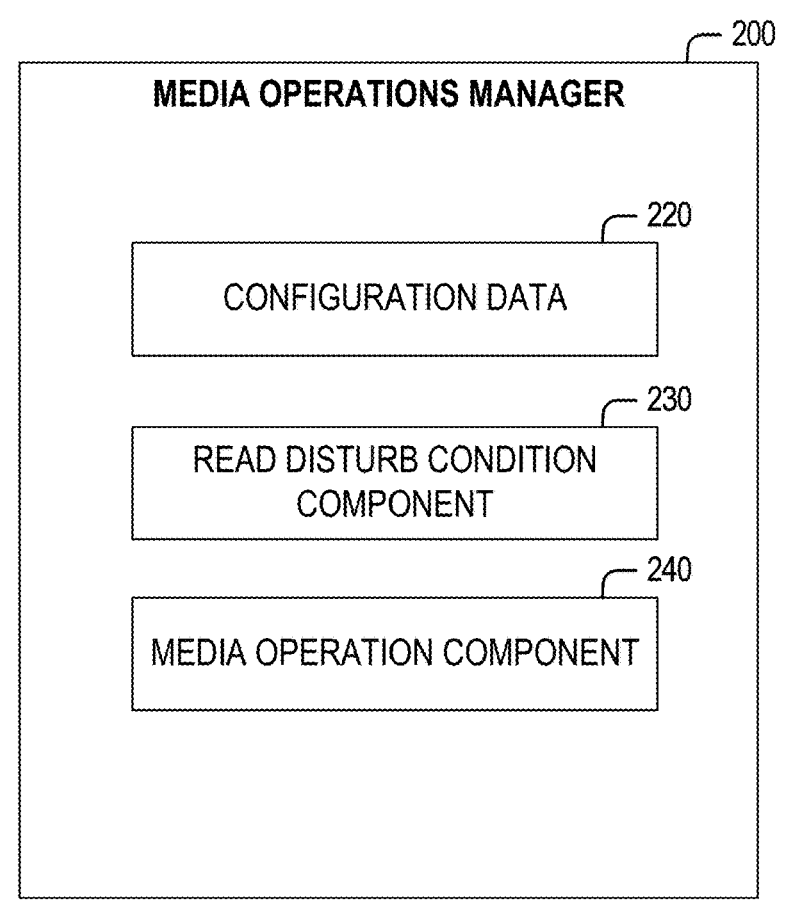
FIG. 2 is a block diagram of an example media operations manager, in accordance with some examples.

FIG. 2 is a block diagram of an example media operations manager 200 (corresponding to media operations manager 122), in accordance with some examples. As illustrated, the media operations manager 200 includes configuration data 220, a read disturb condition component 230, and a media operation component 240. For some examples, the media operations manager 122 can differ in components or arrangement (e.g., less or fewer components) from what is illustrated in FIG. 2.

The configuration data 220 accesses and/or stores configuration data associated with the memory components 112A to 112N. In some examples, the configuration data 220 is programmed into the media operations manager 122. For example, the media operations manager 122 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including temperature tolerances or thresholds of different bins, groups, blocks, WLs, or sets of the memory components 112A to 112N. The media operations manager 122 receives the configuration data from the host system 120 and stores the configuration data in the configuration data 220.

The condition component 230 accesses a temperature sensor associated with the memory sub-system 110 to determine a current temperature of the memory sub-system 110. The condition component 230 can then search the configuration data 220 to identify a first temperature range (e.g., 25 degrees Celsius) in which the current temperature falls. For example, the condition component 230 can determine that the current temperature is below the first temperature range. The condition component 230 can identify a first set of read disturb conditions or criteria associated with the identified temperature range. For example, the condition component 230 can determine that the first set of read disturb conditions or criteria define a first read count threshold (e.g., 100 k reads) for a first quantity of PEC count values (e.g., BOL) and a second read count threshold (e.g., 300 k reads) for a second quantity of PEC count values (e.g., EOL).

The condition component 230 can obtain a current read count value associated with an individual memory component of the memory components 112A to 112N. The condition component 230 can also obtain a current PEC count value for the individual memory component. The condition component 230 can determine that the current PEC count value of the individual memory component corresponds to or is within the first quantity of PEC count values. In such cases, the condition component 230 can set, select, and/or adjust the read count threshold for the individual memory component to the first read count threshold value. In cases where the condition component 230 determines that the current PEC count value of the individual memory component corresponds to or is within the second quantity of PEC count values, the condition component 230 can set, select, and/or adjust the read count threshold for the individual memory component to the second read count threshold value.

The condition component 230 can compare the current read count value associated with the individual memory component with the set or adjusted value of the read count threshold. The condition component 230 can determine that the current read count value transgresses the set or adjusted value of the read count threshold. In such cases, the condition component 230 can instruct the media operation component 240 to perform a media management operation on the individual memory component, such as a read disturb scan. The media operation component 240 can identify a set of predetermined WLs of the individual memory component that are prone to temperature variation or that have different read performances across different ranges of temperatures more than other WLs. The media operation component 240 can then read data from the set of predetermined WLs only and compare the RBER of the read data to an RBER threshold. If the RBER transgresses the RBER threshold, the media operation component 240 can fold the data or rewrite or refresh the data stored in the individual memory component to another memory component or memory block.

In some examples, the condition component 230 accesses a temperature sensor associated with the memory sub-system 110 to determine a current temperature of the memory sub-system 110. The condition component 230 can then search the configuration data 220 to identify a second temperature range (e.g., 25 degrees Celsius) in which the current temperature falls. For example, the condition component 230 can determine that the current temperature is above the second temperature range. The condition component 230 can identify a second set of read disturb conditions or criteria associated with the identified temperature range. For example, the condition component 230 can determine that the second set of read disturb conditions or criteria define a third read count threshold (e.g., 250 k reads) for any quantity of PEC count values. The condition component 230 can set or adjust the read count threshold for the individual memory component based on the third read count threshold.

In such cases, the condition component 230 can compare the current read count value associated with the individual memory component with the set or adjusted value of the third read count threshold. The condition component 230 can determine that the current read count value transgresses the set or adjusted value of the third read count threshold. In such cases, the condition component 230 can instruct the media operation component 240 to perform a media management operation on the individual memory component, such as a read disturb scan. The media operation component 240 can identify a set of predetermined WLs of the individual memory component that are prone to temperature variation or that have different read performances across different ranges of temperatures more than other WLs. The media operation component 240 can then read data from the set of predetermined WLs only and compare the RBER of the read data to an RBER threshold. If the RBER transgresses the RBER threshold, the media operation component 240 can fold the data or rewrite or refresh the data stored in the individual memory component to another memory component or memory block.

FIG. 3 is a flow diagram of an example method 300 to perform media management operations based on temperature of the memory sub-system 110, in accordance with some examples. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 300 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 3, the method (or process) 300 begins at operation 305, with a media operations manager 122 of a memory sub-system determining a read disturb condition criterion associated with an individual memory component of the set of memory components. For some examples, the disturb condition criterion is received from a host system (e.g., the host system 120) communicatively coupled to the memory sub-system. In other cases, the disturb condition criterion is locally stored in the configuration data of the memory sub-system 110. At operation 310, the media operations manager 122 of the memory sub-system determines a temperature of the memory sub-system. Thereafter, at operation 315, the media operations manager 122 adjusts the read disturb condition criterion based on the temperature of the memory sub-system and, at operation 320, performs an individual media management operation on the individual memory component in response to determining that the adjusted read disturb condition criterion has been satisfied.

Figure 4:
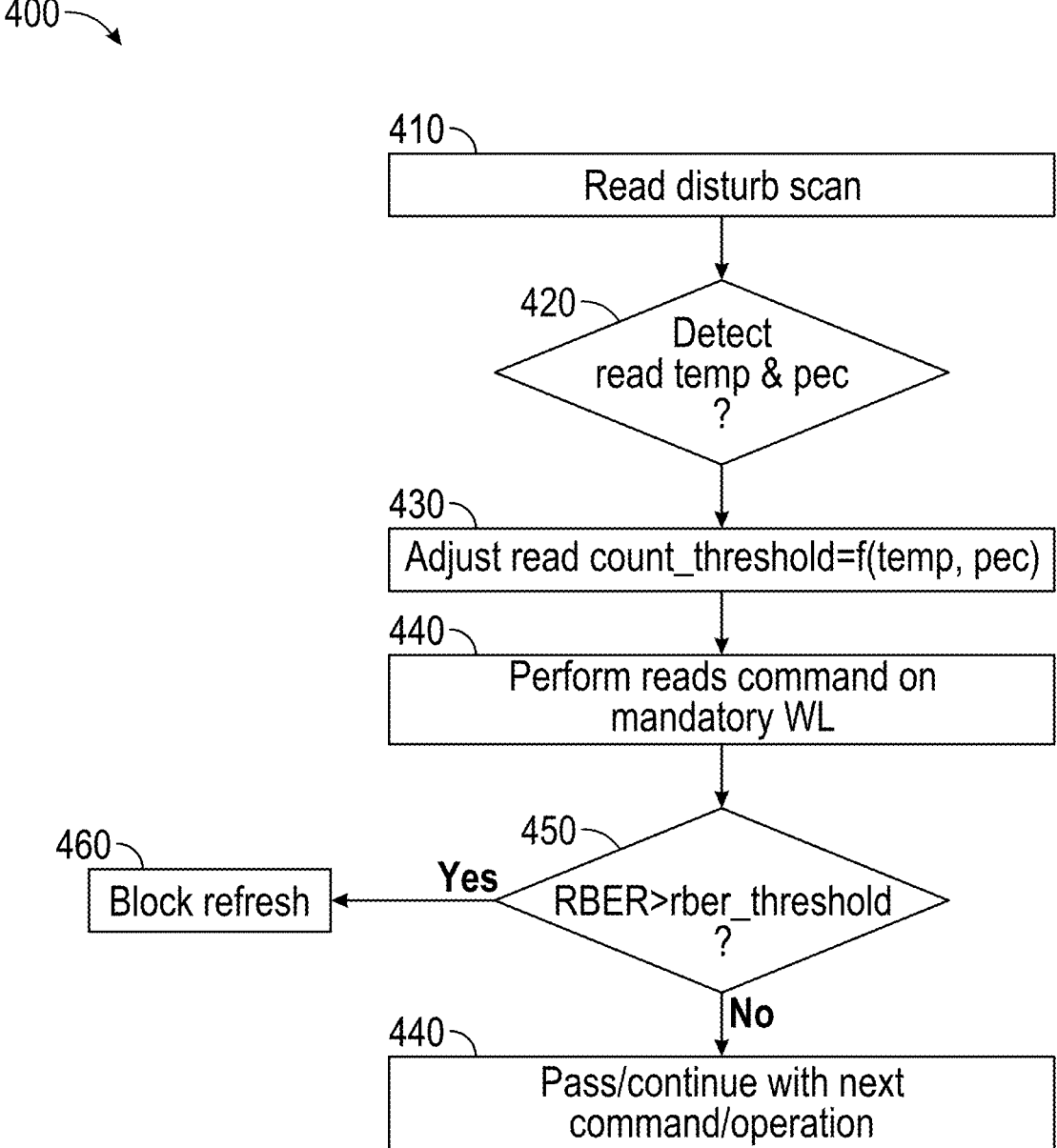

FIG. 4 is a flow diagram of an example method 400 to perform media management operations based on temperature of the memory sub-system 110, in accordance with some examples. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 400 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 410 where the media operations manager 200 performs a read disturb scan operation or begins the process of performing a read disturb scan operation to determine whether the RBER of specified WLs of the memory components transgress an RBER threshold. The media operations manager 200 detects the current read temperature of the memory sub-system 110 and obtains the current PEC count value of an individual memory component at operation 420. Then, at operation 430, the media operations manager 200 accesses the configuration data 220 to obtain a map or table that associates different read temperature values with different read disturb criteria (e.g., read count thresholds). For example, the media operations manager 200 can set the read count threshold value for the individual memory component, used to trigger performing the read disturb scan operations on certain WLs of the memory component based on the current detected read temperature value and/or the current PEC count value of the individual memory component. At operation 440, the media operations manager 200 performs a read command on certain WLs (e.g., the mandatory WLs) of the individual memory component and obtains an RBER of the read data.

The media operations manager 200, at operation 450, determines if the RBER transgresses an RBER threshold value. If so, the media operations manager 200 proceeds to operation 460 where the individual memory component is refreshed or folded. If not, the media operations manager 200 proceeds to operation 470 where the individual memory component is passed and a next memory component is analyzed.

In view of the disclosure above, various examples are set forth below. It should be noted that one or more features of an example, taken in isolation or combination, should be considered within the disclosure of this application.

Example 1. A system comprising: a set of memory components of a memory sub-system; and a processing device operatively coupled to the set of memory components, the processing device being configured to perform operations comprising: determining a read disturb condition criterion associated with an individual memory component of the set of memory components; determining a temperature of the memory sub-system; adjusting the read disturb condition criterion based on the temperature of the memory sub-system; and performing an individual media management operation on the individual memory component in response to determining that the adjusted read disturb condition criterion has been satisfied.

Example 2. The system of Example 1, wherein the adjusted read disturb condition criterion comprises an adjusted read count threshold.

Example 3. The system of Example 2, the operations comprising: accessing a current read counter associated with the individual memory component; and determining that the current read counter transgresses the adjusted read count threshold, the adjusted read disturb condition criterion being satisfied in response to determining that the current read counter transgresses the adjusted read count threshold.

Example 4. The system of Example 3, the operations comprising: incrementing the current read counter each time a read operation is performed for the individual memory component.

Example 5. The system of any one of Examples 1-4, wherein the individual media management operation comprises a read disturb operation comprising: reading data from the individual memory component; and computing a read bit error rate (RBER) for the data read from the individual memory component.

Example 6. The system of Example 5, the operations comprising: comparing the RBER to an RBER threshold; and refreshing or folding the data stored in the individual memory component in response to comparing the RBER to the RBER threshold.

Example 7. The system of any one of Examples 5-6, the operations comprising: identifying a subset of word lines (WLs) of the individual memory component that are associated with increased temperature sensitivity relative to other WLs of the individual memory component.

Example 8. The system of Example 7, the operations comprising: reading the data from only the subset of WLs to compute the RBER for the read disturb operation.

Example 9. The system of any one of Examples 1-8, wherein the set of memory components comprises one or more memory dies.

Example 10. The system of any one of Examples 1-9, wherein the set of memory components comprises one or more memory blocks.

Example 11. The system of any one of Examples 1-10, the operations comprising: accessing a temperature threshold; determining whether the temperature of the memory sub-system is below the temperature threshold; and setting the read disturb condition criterion to a first read disturb condition criterion in response to determining that the temperature of the memory sub-system is below the temperature threshold.

Example 12. The system of Example 11, the operations comprising: setting the read disturb condition criterion to a second read disturb condition criterion in response to determining that the temperature of the memory sub-system is above the temperature threshold.

Example 13. The system of Example 12, wherein the second read disturb condition criterion is selected independently of a program erase count (PEC) associated with the individual memory component in response to determining that the temperature of the memory sub-system is above the temperature threshold.

Example 14. The system of any one of Examples 12-13, the operations comprising: computing a program erase count (PEC) associated with the individual memory component; and selecting the second read disturb condition criterion from a plurality of criteria based on the PEC associated with the individual memory component.

Example 15. The system of Example 14, the operations comprising: determining that the PEC corresponds to a beginning of life (BOL) of the individual memory component; and selecting a first read count threshold value as the second read disturb condition.

Example 16. The system of Example 15, the operations comprising: determining that the PEC corresponds to an end of life (EOL) of the individual memory component; and selecting a second read count threshold value as the second read disturb condition, the second read count threshold value being greater than the first read count threshold value.

Example 17. The system of any one of Examples 1-16, wherein determining the temperature comprises accessing a temperature measurement from a sensor of the set of memory components.

Methods and computer-readable storage medium with instructions for performing any one of the above Examples.

Figure 5:
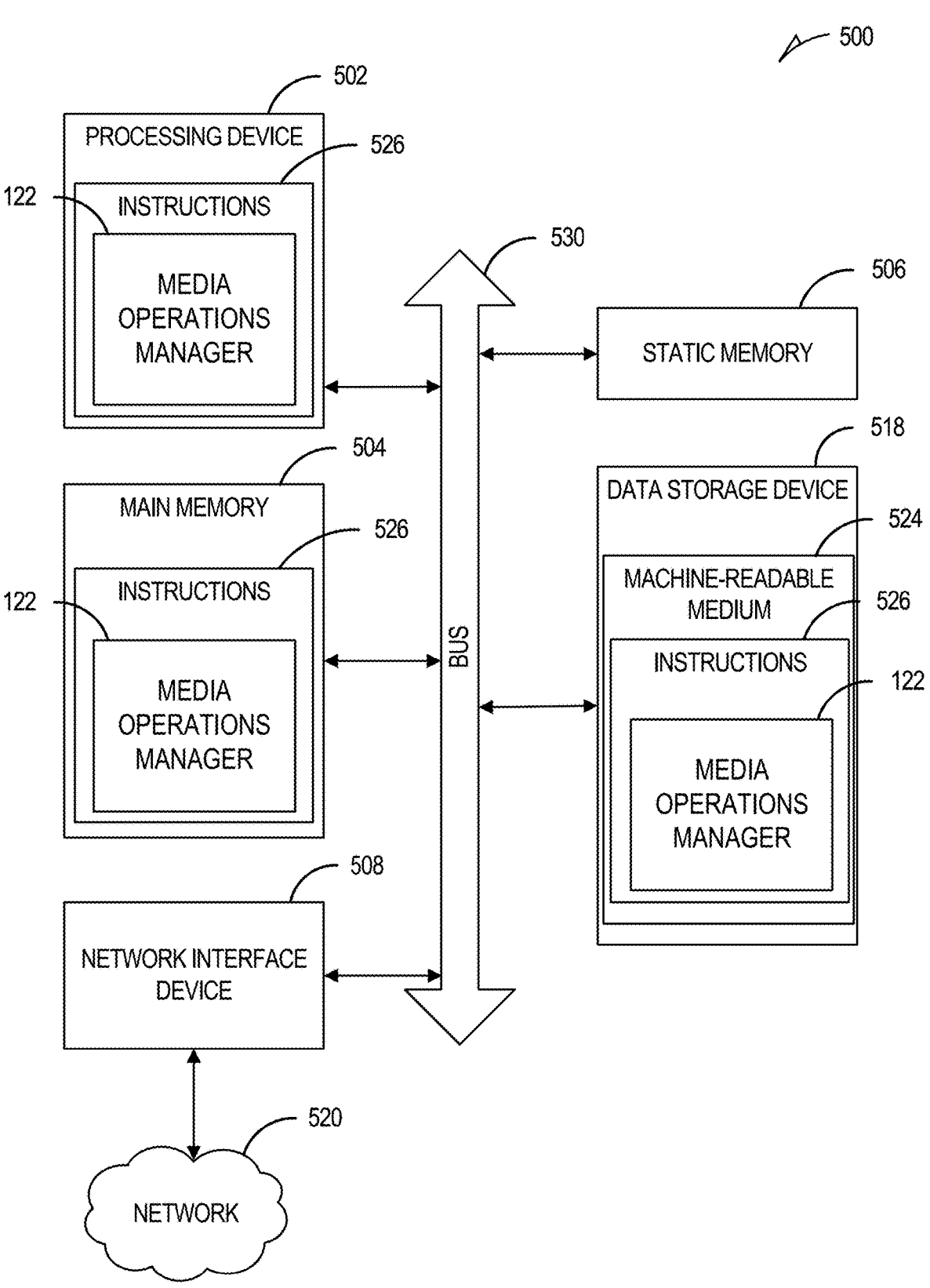
FIG. 5 is a block diagram illustrating a diagrammatic representation of a machine in the form of a computer system within which a set of instructions can be executed for causing the machine to perform any one or more of the methodologies discussed herein, in accordance with some examples.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 implement functionality corresponding to the media operations manager 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, examples of the disclosure have been described with reference to specific example embodiments thereof. It will be evident that various modifications can be made thereto without departing from the broader examples of the disclosure as set forth in the following claims. The specification and drawings are, accordingly, to be regarded in an illustrative sense rather than a restrictive sense.

What is claimed is:

1. A system comprising:
a set of memory components of a memory sub-system; and
a processing device operatively coupled to the set of memory components, the processing device being programmed to perform operations comprising:
determining a read disturb condition criterion associated with an individual memory component of the set of memory components;
determining a temperature of the memory sub-system;
adjusting the read disturb condition criterion based on the temperature of the memory sub-system, the adjusting of the read disturb criterion comprising selecting between a first read count threshold value and a second read count threshold value to trigger a read disturb operation based on the temperature of the memory sub-system; and
performing an individual media management operation on the individual memory component based on determining that the adjusted read disturb condition criterion has been satisfied, the individual media management operation comprising reading data from only a subset of word lines (WLs), that are associated with increased temperature sensitivity relative to other WLs, to compute an error rate for the read disturb operation.

2. The system of claim 1, wherein the adjusted read disturb condition criterion comprises an adjusted read count threshold.

3. The system of claim 2, the operations comprising:
accessing a current read counter associated with the individual memory component; and
determining that the current read counter transgresses the adjusted read count threshold, the adjusted read disturb condition criterion being satisfied in response to determining that the current read counter transgresses the adjusted read count threshold.

4. The system of claim 3, the operations comprising:
incrementing the current read counter each time a read operation is performed for the individual memory component.

5. The system of claim 1, wherein the individual media management operation comprises a read disturb operation comprising:
reading data from the individual memory component; and
computing an error rate for the data read from the individual memory component.

6. The system of claim 5, the operations comprising:
comparing the error rate to an error rate threshold; and
refreshing or folding the data stored in the individual memory component in response to comparing the error rate to the error rate threshold.

7. The system of claim 5, the operations comprising:
identifying a subset of WLs of the individual memory component that are associated with increased temperature sensitivity relative to other WLs of the individual memory component.

8. The system of claim 7, the operations comprising:
reading the data from only the subset of WLs to compute the error rate for the read disturb operation.

9. The system of claim 1, wherein the set of memory components comprises one or more memory blocks.

10. The system of claim 1, the operations comprising:
accessing a temperature threshold;
determining whether the temperature of the memory sub-system is below the temperature threshold; and
setting the read disturb condition criterion to a first read disturb condition criterion in response to determining that the temperature of the memory sub-system is below the temperature threshold.

11. The system of claim 10, the operations comprising:
setting the read disturb condition criterion to a second read disturb condition criterion in response to determining that the temperature of the memory sub-system is above the temperature threshold.

12. The system of claim 11, wherein the second read disturb condition criterion is selected independently of a program erase count (PEC) associated with the individual memory component in response to determining that the temperature of the memory sub-system is above the temperature threshold.

13. The system of claim 11, the operations comprising:
computing a program erase count (PEC) associated with the individual memory component; and
selecting the second read disturb condition criterion from a plurality of criteria based on the PEC associated with the individual memory component.

14. The system of claim 13, the operations comprising:
determining that the PEC corresponds to a beginning of life (BOL) of the individual memory component; and
selecting the first read count threshold value as the second read disturb condition.

15. The system of claim 14, the operations comprising:
determining that the PEC corresponds to an end of life (EOL) of the individual memory component; and
in response to determining that the PEC corresponds to the EOL, selecting the second read count threshold value as the second read disturb condition, the second read count threshold value being greater than the first read count threshold value.

16. The system of claim 1, the operations comprising:
determining that a program-erase count (PEC) corresponds to an end of life (EOL) of the individual memory component; and
in response to determining that the PEC corresponds to the EOL of the individual memory component, selecting the second read count threshold value, the second read count threshold value being greater than the first read count threshold value.

17. A method comprising:
determining a read disturb condition criterion associated with an individual memory component of a set of memory components;
determining a temperature of a memory sub-system comprising the set of memory components;
adjusting the read disturb condition criterion based on the temperature of the memory sub-system, the adjusting of the read disturb criterion comprising selecting between a first read count threshold value and a second read count threshold value to trigger a read disturb operation based on the temperature of the memory sub-system; and performing an individual media management operation on the individual memory component based on determining that the adjusted read disturb condition criterion has been satisfied, the individual media management operation comprising reading data from only a subset of word lines (WLs), that are associated with increased temperature sensitivity relative to other WLs, to compute an error rate for the read disturb operation.

18. The method of claim 17, wherein the adjusted read disturb condition criterion comprises an adjusted read count threshold.

19. A non-transitory computer-readable storage medium comprising instructions that, when executed by a processing device, cause the processing device to perform operations comprising:

determining a read disturb condition criterion associated with an individual memory component of a set of memory components;

determining a temperature of a memory sub-system comprising the set of memory components;

adjusting the read disturb condition criterion based on the temperature of the memory sub-system, the adjusting of the read disturb criterion comprising selecting between a first read count threshold value and a second read count threshold value to trigger a read disturb operation based on the temperature of the memory sub-system, the second read count threshold value being selected as in response to determining that a program-erase count corresponds to an end-of-life of the individual memory component, the second read count threshold value being greater than the first read count threshold value; and performing an individual media management operation on the individual memory component based on determining that the adjusted read disturb condition criterion has been satisfied.

* * * * *